United States Patent [19]
Boron

[11] 3,897,689
[45] Aug. 5, 1975

[54] SAMPLING APPARATUS

[75] Inventor: Joseph J. Boron, Medina, Ohio

[73] Assignee: Aikoh Co., Ltd., Tokyo, Japan

[22] Filed: Jan. 30, 1974

[21] Appl. No.: 437,977

Related U.S. Application Data

[63] Continuation-in-part of Ser. No. 252,827, May 12, 1972, Pat. No. 3,798,974.

[52] U.S. Cl............................ 73/425.4 R; 73/DIG. 9
[51] Int. Cl. ............................................. G01n 1/12
[58] Field of Search........ 73/425.4 R, DIG. 9; 164/4

[56] References Cited
UNITED STATES PATENTS

| | | | |
|---|---|---|---|
| 3,646,816 | 3/1972 | Hance | 73/DIG. 9 |
| 3,656,350 | 4/1972 | Collins | 73/DIG. 9 |

*Primary Examiner*—S. Clement Swisher
*Attorney, Agent, or Firm*—Fay & Sharpe

[57] ABSTRACT

The specification and drawings disclose three embodiments of an apparatus for taking samples from a flowing stream of molten metal. The preferred embodiment comprises a separable sample mold having a thermal shock resistant tube connected thereto. The mold and tube are slidably mounted in a cylindrical, open ended housing. The housing is arranged to totally enclose the mold and tube in a first position. In a second position the tube extends out of the housing for sample taking. Other features disclosed include an arrangement for providing a small diameter pin of sample metal and a system for bonding a hook or loop of metal in the sample for tagging purposes. Also disclosed is a sampling device wherein the mold chamber can be continually reused with only the sample tube portion being a replaceable component.

4 Claims, 18 Drawing Figures

PATENTED AUG 5 1975　　3,897,689

SHEET 1

SAMPLING APPARATUS

This application is a continuation-in-part of U.S. patent application Ser. No. 252,827, filed May 12, 1972, for SAMPLING APPARATUS now U.S. Pat. No. 3,798,974.

The subject invention is directed toward the art of measuring and testing and, more particularly, to an improved sampling device.

The invention is particularly suited for taking samples from streams of molten steel and will be described with special reference thereto; however, as will become apparent, the invention is capable of broader application and could be used for many different types of metals.

One known device for sampling a stream of molten metal comprises a small, separable sample mold container formed, for example, from powdered iron. A quartz tube connects to the sample mold and both the mold and a portion of the tube are encased in core mold sand. The outer end of the quartz tube is open and extends from the core mold sand casing. The unit is mounted in a cylindrical housing tube with the open end of the quartz tube extending outwardly.

To use the assembly, the cylindrical tube is, in turn, mounted on the outer end of a long lance or the like. The person taking the sample can thus stand at a safe distance from the stream of metal and manipulate the lance to move the open end of the quartz tube into the metal stream. The molten metal flows through the quartz tube and into the mold container. In approximately five seconds, the sample mold is filled and the assembly is withdrawn from the stream. After cooling, the core sand surrounding the mold and the quartz tube are broken, mold container separated and the solidified metal sample removed.

The described assembly definitely facilitates sample taking from molten metal streams. However, it has certain disadvantages. For example, the exposed end of the quartz tube must be enclosed by some type of protective cover during shipping and handling. Moreover, manufacturing problems are encountered in applying the core sand casing. Also, the casing increases the weight and cost of the unit.

The subject invention provides an improved construction for the above-described type of sampling device. Sampling devices formed in accordance with the invention are simpler, and less expensive to construct than the prior devices. Further, the subject overcomes problems previously encountered in shipping and handling. In particular, the invention contemplates an assembly which includes a mold container preferably formed from separable sections and having an open end. A sample receiving tube is joined to the mold container. The mold and sample tube are positioned in a tubular, open ended housing. Preferably, the mold and sample tube are movable in the housing between at least two positions including a first position wherein the sample tube is enclosed and protected by the housing and a second position wherein the tube extends from the housing for sample taking.

A more specific aspect of the invention contemplates that preferably, but not necessarily, the housing will comprise a single, open ended cylinder of paper board or the like. The length of the cylinder is desirably at least as great as the total length of the sample tube and mold. Also, the sample tube and mold assembly are preferably slidably received in the cylinder. Thus, merely by shifting the assembly in the cylinder, the sample tube can be moved to a protected position for shipping and handling, or extended from the housing for sample taking.

Preferably, but not necessarily, when used for sample taking, the housing cylinder is mounted on a handle or the like having an end portion adapted to be received in the cylinder a distance sufficient to cause the sample tube to extend out a suitable distance for sample taking. This assures that the sample tube is properly located relative to the housing when mounted for use.

The invention also contemplates sampling device wherein the mold chamber comprises a plurality of separable mold sections in which a sample tube assembly is clampingly retained. Preferably, the mold chamber forming elements are arranged to be clamped together for use by an associated handle assembly. In the preferred embodiment, the mold chamber members are provided with a tapered exterior which is received in an opening in the handle assembly. The arrangement is such that when the mold sections are clamped together, the sample tube assembly is firmly gripped and held by the mold sections.

Accordingly, a primary object of the invention is the provision of a simplified and improved apparatus for taking samples from streams of molten metal.

Another object is the provision of an apparatus of the type described wherein a simple, tubular housing serves as a shipping container and also provides a means for mounting the assembly for sample taking operations.

Another object of the invention is the provision of an apparatus of the type described which is relatively inexpensive to manufacture and easy to use.

Another object of the invention is the provision of a sampling device wherein the mold chamber elements can be reused repeatedly and wherein they are held in proper assembled relationship by a handle assembly.

The above and other objects and advantages will become apparent from the following description when read in conjunction with the accompanying drawings wherein.

Figure 2:
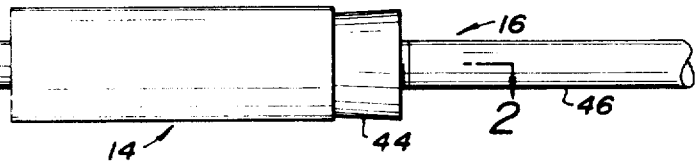
FIG. 2 is an enlarged, cross-sectional view taken on line 2—2 of FIG. 1 (portions of the device have been broken away to shown certain details of construction more clearly)
Figure 3:
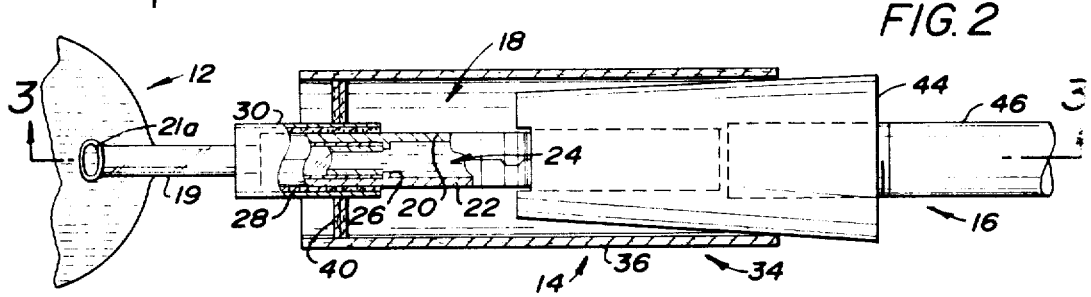
FIG. 3 is a cross-sectional view taken on lines 3—3 of FIG. 2.
Figure 3:
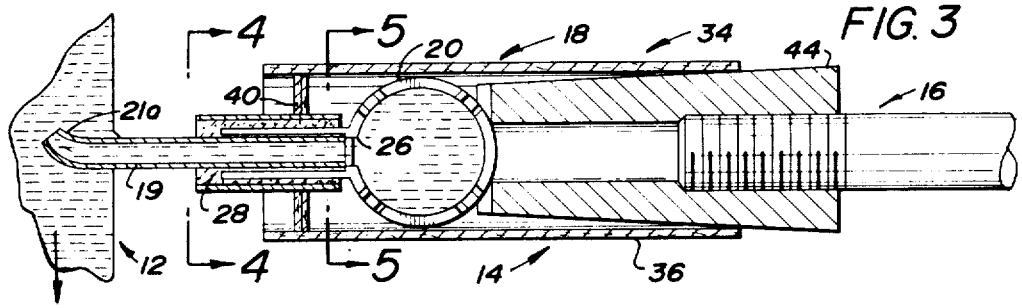
Figure 4:
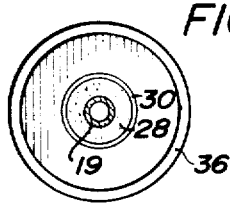
Figure 5:
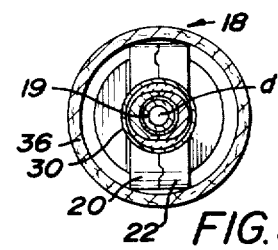
Figure 6:
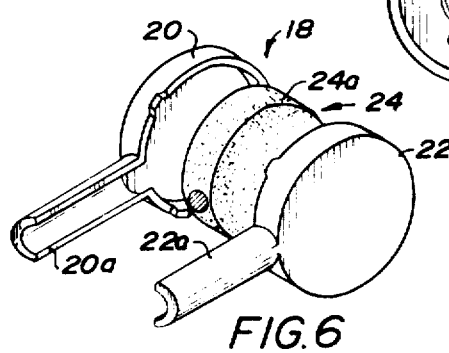
Figure 7:
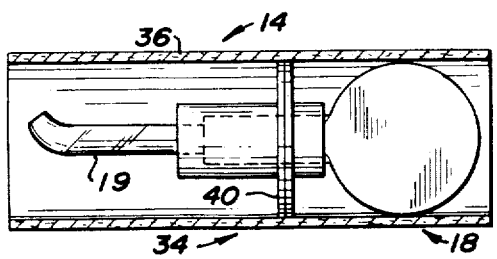
Figure 8:
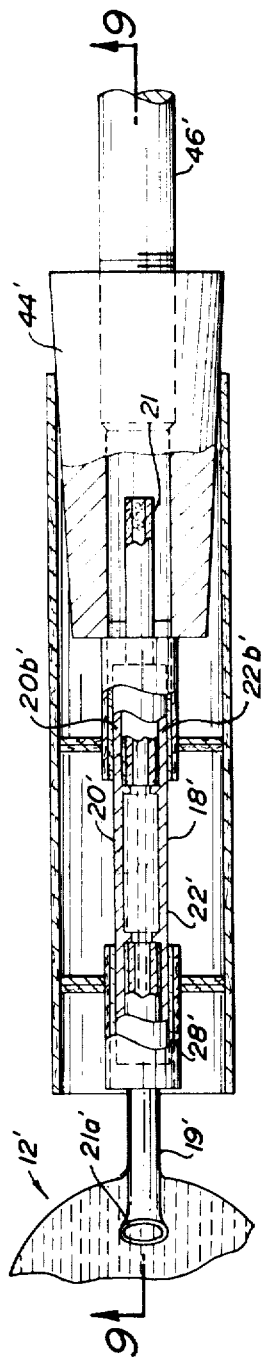
Figure 9:
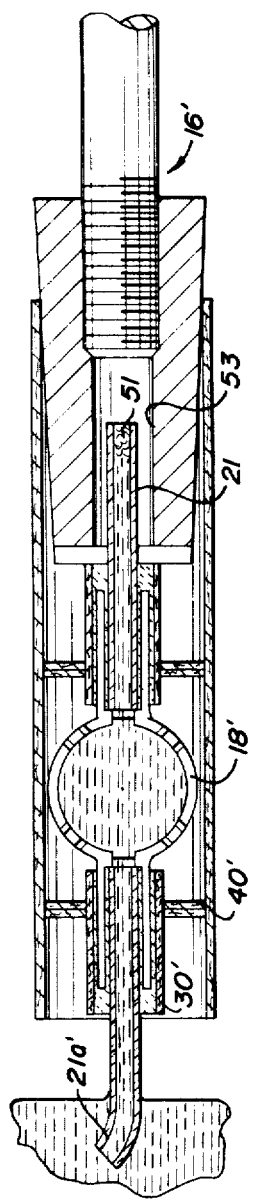
Figure 10:
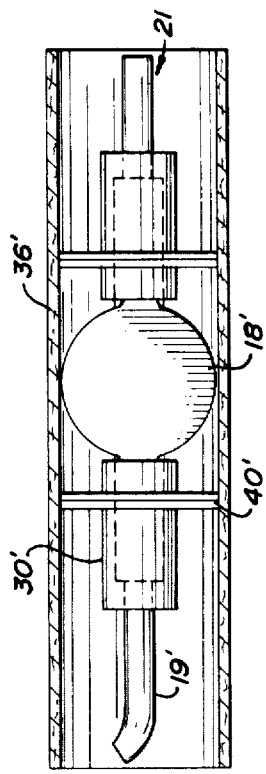
Figure 11:
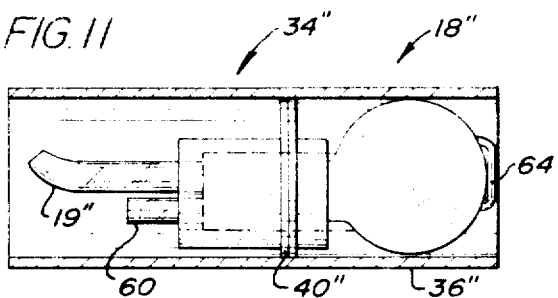
Figure 12:
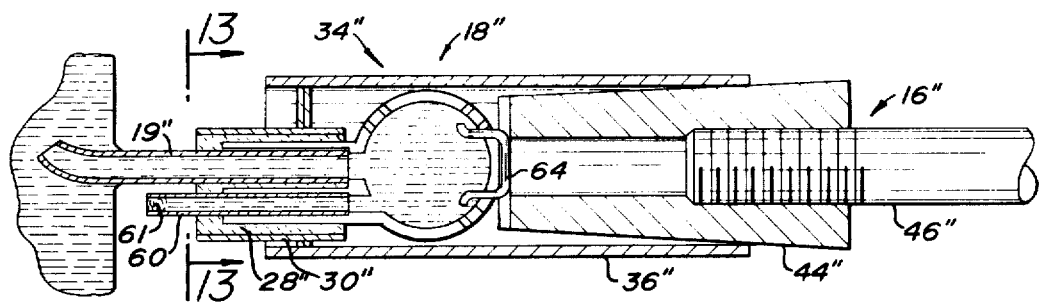
Figure 13:
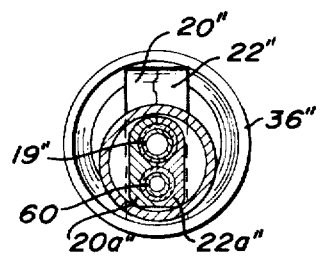
Figure 14:
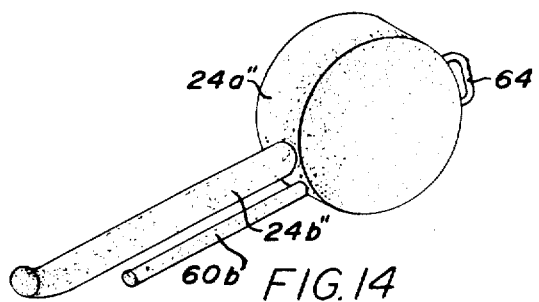
Figure 15:
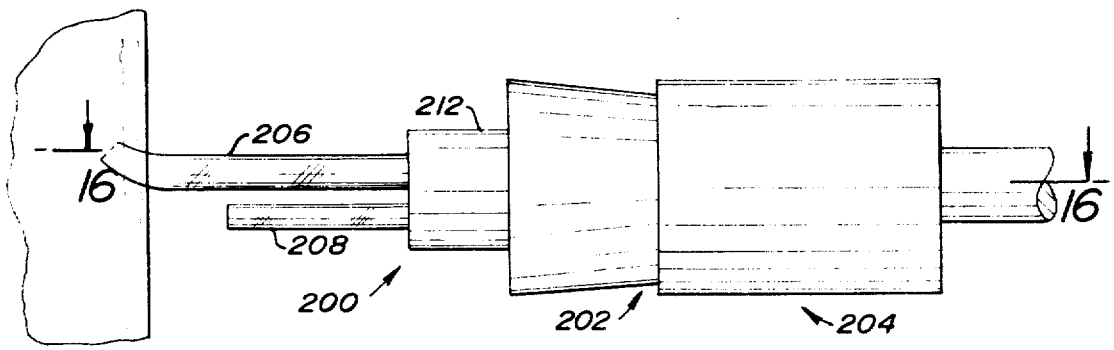
Figure 16:
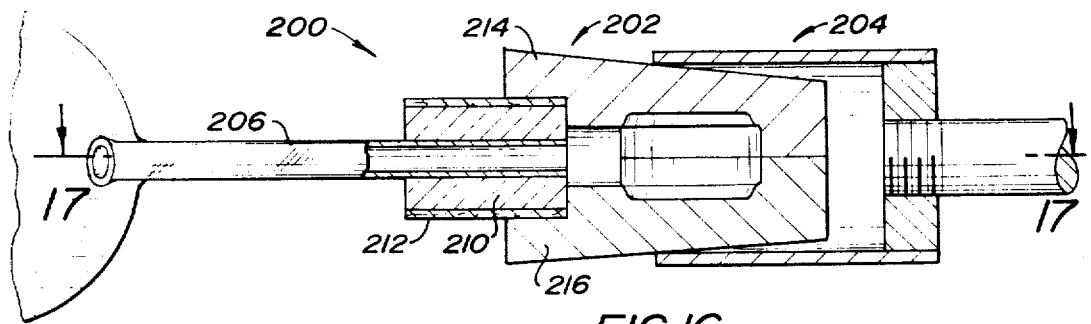
Figure 17:
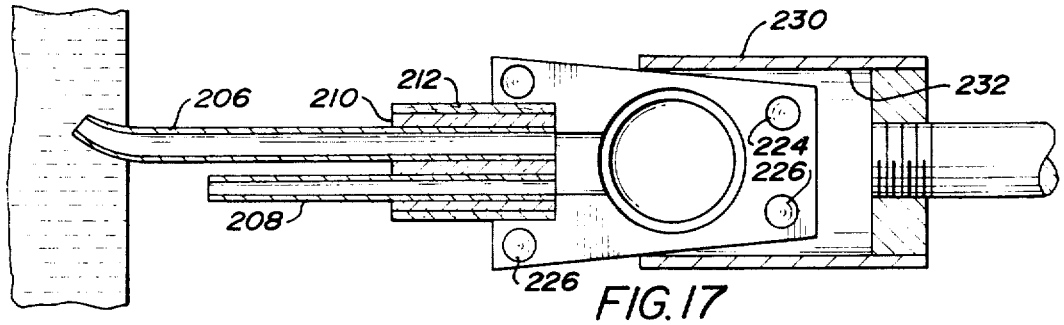
Figure 18:
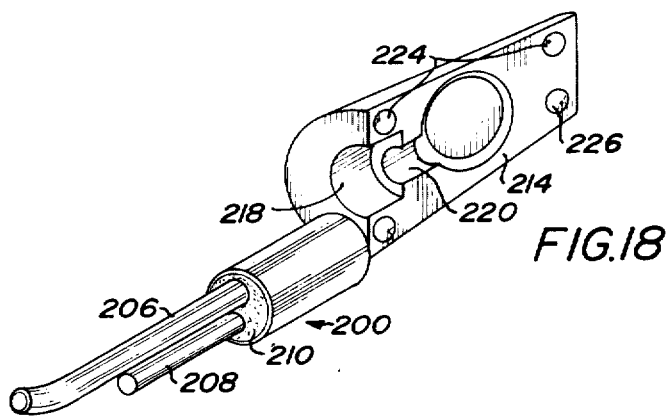

FIG. 4 and 5 are cross-sectional views taken on lines 4—4 and 5—5 respectively of FIG. 3;

FIG. 6 is an exploded pictorial view of the mold container portion of the assembly showing removal of a solidified metal sample;

FIG. 7 is a cross-sectional view showing the assembly in its shipping or handling position;

FIG. 8 is a cross-sectional view similar to FIG. 2 but showing a modified form of the invention;

FIG. 9 is a view taken on line 9—9 of FIG. 8;

FIG. 10 is a cross-sectional view showing the device of FIGS. 9 and 10 in its handling and shipping position;

FIG. 11 is a view similar to FIG. 7 but illustrating a third embodiment of the sampling assembly;

FIG. 12 is a view similar to FIG. 3 but showing the FIG. 11 embodiment being used for sample taking;

FIG. 13 is a cross-sectional view taken on line 13—13 of FIG. 12;

FIG. 14 is a pictorial view of the solidified sample after removal from the FIG. 11 embodiment;

FIG. 15 is a side elevational view of a forth embodiment formed in accordance with the invention;

FIG. 16 is a cross-sectional view taken on line 16—16 of FIG. 15;

FIG. 17 is a cross-sectional view taken on line 17—17 of FIG. 16; and,

FIG. 18 is a pictoral view showing the sample tube assembly and half of the mold chamber assembly.

Figure 1:
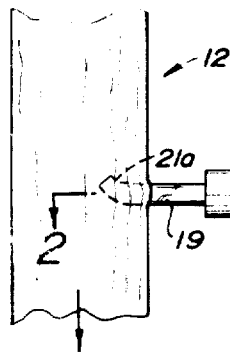
FIG. 1 is an elevational view showing a sampling device formed in accordance with the invention being used for obtaining a sample from a stream of molten metal.

Referring more particularly to the drawings wherein the showings are for the purpose of illustrating preferred embodiments of the invention only, and not for the purpose of limiting same, FIG. 1 shows a stream of molten steel 12 which can, for example, be coming from a pouring ladle or the like. A sampling device 14 formed in accordance with the invention is illustrated as being mounted at the end of a long handle or lance member 16 and positioned such that a small sample of molten metal is being removed from stream 12 for analysis or testing.

FIGS. 2 and 3 best illustrate the details of the preferred form of the sampling assembly 14. In FIGS. 2 and 3 the assembly is shown in its sampling position. In general, the sampling assembly is shown as including a separable assembly 18 which defines a small mold container. Joined to assembly 18 is a sample tube 19 formed from quartz or other material capable of withstanding the temperatures and thermal shocks experienced in taking a sample from the molten metal stream.

In the embodiment under consideration, the assembly 18 is formed from two mating sections 20 and 22. Although sections 20 and 22 could be formed from many different materials and a variety of techniques, in the subject embodiment they are formed from powdered iron using known techniques. As shown, each of the half sections 20, 22 include an outwardly extending neck or inlet forming portion 20a, 22a respectively. The interiors of the sections 20, 22 dished as shown so that when positioned together they define an open inner chamber 24.

The sample tube 19 is relatively closely received within the neck portions 20a and 22a in the manner shown in FIG. 3. Note that a small shoulder 26 is formed about the inner wall of the neck portions so as to provide a stop for proper positioning of the sample tube 19.

In the embodiment under consideration, the sample tube 19 is joined to the sample mold 18 by a refractory cement 28. A thin walled paper tube or the like 30 is positioned circumferentially about the neck portion 20a and 22a and the refractory ceramic cement fills the annulus between the inner wall of the tube and the outer wall of the neck. During manufacture of the assembly, tube 30 serves to confine the cement until it hardens.

The sample tube and sample mold assembly are mounted in a housing 34 which, in the preferred embodiment, comprises an elongated tubular member 36. The tubular member 36 comprises a cylinder of relatively heavy paper board having open ends. The total length of the cylinder 36 is preferably at least as great as the total length of the sample tube and mold assembly. Additionally, as best seen in FIG. 5, the inner diameter of the cylinder 36 is preferably approximately equal to the diagonal dimension $d$ across mold 18. This allows the assembly to be slidably received within the tube 36.

In order further to orient and position the tube and mold assembly within the housing 34, a disc member 40 is received on the tube 30 and has a diameter corresponding approximately to the inner diameter of cylinder 36. This maintains the assembly properly positioned but allows it to slide within the cylinder.

As previously mentioned, the sample tube and mold assembly is slidable within the housing 34. This allows it to be moved between a shipping, handling or storage position to a sampling position.

The first or shipping position of the sample tube and mold assembly within the housing 34 is illustrated in FIG. 7. Note that in this position the quartz tube 19 is enclosed and thus protected for shipment and handling. To allow the unit to be used for sample taking, the sample tube mold assembly is merely slid within the housing 34 to the position shown in FIGS. 2 and 3. It should be understood that there should be sufficient frictional engagement between the housing and the sample tube and mold assembly to prevent inadvertent movement during ordinary handling. However, the engagement should not be such as to make manual movement particularly difficult.

The housing 34 also serves for mounting the unit at the end of a handle or the like for the sample taking operation. Note that the elongated handle 16 includes an end portion 44 which is threadedly connected to a rod 46. End portion 44 is shown as conically shaped and adapted to enter the end of the cylinder 36. Preferably, the conical end portion 44 is sized so that when it is extended in the cylinder 36 sufficiently properly to hold the unit, the sample tube 19 is extended out of the tube an amount sufficient to permit it to be inserted into the molten metal stream. Further, the conically shaped end portion 44 of the handle 16 allows the sampling device 14 to be easily removed from the handle after the sample taking operation. For example, by tapping device 14 against the floor it will be released from the handle assembly since there is no fixed positive mechanical connection between the housing and the tube.

Referring again to FIGS. 1–3, it will be seen that the open outer end 21a of sample tube 19 is preferably curved as shown. This allows the sample tube to be inserted in the stream and receive the flowing metal. The metal of course impacts the tube therethrough into the mold 18. Both the mold 18 and the tube 19 are, of course, filled relatively quickly with molten metal. For example, in approximately 5 seconds, the internal chamber of both the mold and the tube are completely filled with molten metal. It should be understood that air within mold chamber 24 is driven out through the parting line between mold halves 20, 22.

Although the stream of molten metal is at an extremely high temperature the outer housing 34 can be merely a heavy paper board tube. The paper board is capable of withstanding the temperatures encountered sufficiently to maintain structural integrity throughout the time period required. Moreover, after use the assembly can be easily removed from the housing tube 34 so that the solidified sample can be obtained merely by smashing the refractory cement joining the tube 19 to the mold halves and separating the mold halves as shown in FIG. 6.

The resulting solidified metal sample has the shape best shown in FIG. 6. Note that it comprises a main body 24a and an elongated cylindrical section 24b which corresponds to the interior of the quartz tube 19. Depending upon the particular test being performed on the sample, the tube 19 can be sized so as to produce a cylindrical portion of desired weight and/or length or, weight per unit of length.

FIGS. 8-10 show a modification of the sampling assembly which is closely similar to the FIGS. 1-7 embodiment. The reference numerals used for corresponding elements are the same as those used in the FIGS. 1-7 embodiment but differ therefrom by the addition of a prime (') suffix. The description of one such element is to be taken as equally applicable to the correspondingly numbered element unless otherwise noted. In this embodiment a second tube 21 extends to the right from the mold container 18'. This embodiment thus provides a sample with two cylindrical sections of a desired size to allow tests to be conducted with specified, predetermined size sections. Mold container 18' is constructed generally the same as mold container 18 of FIGS. 1-7; however, a second neck portion 20b' and 22b' is formed on each half 20' and 22'. The tube 21 is bonded or joined to sections 20b' and 22b' in the same manner as discussed with reference to quartz tube 19.

The outer end of tube 21 is not curved in the manner of tube 19. Additionally, a small portion of metal or ceramic wool or the like 51 is positioned in the end of the tube. This allows air to escape from the tube during the sampling operation while preventing the molten metal from escaping.

FIGS. 8 and 9 show the modified form of sampling devices being used for taking a sample. It should be noted that the end portion 44' of the handle 16' has a central opening 53 into which tube 21 is received. Thus, when the assembly is placed on the handle, the tube 21 is not engaged and cannot be accidentally broken.

Referring to FIG. 10 note that the tube or cylinder 36' is of a length sufficient to enclose tubes 19' and 21' when the assembly is in the shipping or handling position. Because of the slightly greater length of the FIGS. 8-10 embodiment, tube 36' must be correspondingly longer.

FIGS. 11-14 show a third embodiment of the sampling apparatus which also provides a small diameter pin of sample metal so that small pieces of predetermined size or weight can be readily obtained. Elements of this embodiment which correspond to the FIG. 1 embodiment are identified by the same reference numerals differentiated therefrom by a double prime ('') suffix. The elements so identified are to be considered as described with reference to FIG. 1 unless otherwise noted.

In FIG. 11-14 embodiment the mold halves 20'' and 22'' are provided with somewhat larger neck portions 20a'' and 22a''. Also, a second smaller tube 60 is carried under the tube 20''. Tube 60 can be formed from any suitable temperature and thermal shock resistant material such as quartz or Pyrex glass. As shown, tube 60 is in communication with the interior of the mold so that metal can flow from the mold into the tube. Additionally, the end of the tube 60 is plugged with metal or cermaic wool or the like so that air can escape while the molten metal is retained.

The tubes 19'' and 60 are joined to the mold through the use of a refractory cement 28''. It should be appreciated that the sleeve 30'' must be somewhat larger in diameter than the corresponding sleeve 30 of FIG. 1.

FIG. 14 illustrates the shape of the solidified metal sample after it is removed from the mold and tubes. Note that it comprises the main body 24a'' and the two cylindrical pin sections 24b'' and 60b.

The FIG. 11-14 embodiment also illustrates how a tagging loop can be installed in the sample. As best shown in FIGS. 11 and 12, a small loop of wire 64 can be positioned at the parting line between the mold halves 20'' and 22'' in the manner shown. The ends of the loop 64 extend into the mold cavity. Thus, after a sample is taken and solidified the loop is permanently attached as shown in FIG. 14. This allows identifying tags or the like to be readily attached to the sample.

Although not shown, it should be appreciated that materials or substances can be placed within the sample tubes or mold chambers of any of the three embodiments for producing some effect on the sample if desired. For example, a section of aluminum wire can be placed in the sample tubes to serve as a deoxidant.

FIGS. 15-18 show an embodiment of the sampling device wherein the mold forming sections and the sample tube assemblies are readily separable. Broadly, as best shown in FIGS. 16 and 17, this embodiment of the sampling device includes a sample tube assembly 200 and a separable mold chamber assembly 202. FIGS. 15-17 show the mold chamber 202 mounted in the end of a handle assembly 204. Although the sample tube assembly could have a variety of constructions, it is shown as including a sample tube member 206 formed from quartz or similar temperature and thermal shock resistant material. The tube 206 is opened at both ends with its left end (as viewed in the drawings) curved. A second short tube 208 is positioned generally parallel to tube 206 and serves to provide a thin pin of sample material for purposes previously discussed. Tubes 206 and 208 are joined together by a ceramic refractory 210. A tube of resilient paper board or the like to 212 surrounds the refractory cement 210 to retain it during assembly until it is hardened. Additionally, the tube 212 serves to provide a seal between the sample tube assembly 200 and the mold assembly 202 in a matter subsequently to be described.

The sample tube assembly 200 is a separate component as illustrated best in FIG. 18. In this embodiment it is the only element which must be replaced for each sample taking operation. That is, removal of the sample after the sample taking operation results in the destruction of sample tube 200.

The mold assembly 202 could take many forms. It is important to note, however, that, in accordance with this aspect of the invention, it is a reusable assembly which is arranged to hold and cooperate with the sample tube assembly 200 during a sample taking operation. Specifically, in the subject embodiment, mold assembly 202 comprises a pair of identical mold halves 214 and 216. Referring to FIG. 18 mold half 214 is shown in detail. Note that it comprises a body having a somewhat semi-cylindrical configuration and formed from cast iron, powdered metal or the like. A first semi-cylindrical recess 218 extends inwardly from one end. Opening 218 is of a radius only a slight bit smaller than the radius of tube 212 of sample tube assembly 200. A second smaller diameter recess 220 extends from the inner end of the recess 218 into communication with the main mold chamber 222. Mold chamber 222 could have many configurations but it is shown somewhat cylindrical so that a sample having the general shape shown in FIG. 14 is provided.

As mentioned earlier, mold half 216 is identical to mold half 214. To maintain the mold halves in proper relationship, mating recesses 224 and protuberances 226 are provided.

As can be appreciated from the foregoing, when the right hand end of a sample tube assembly 200 is in the recesses 218 of mold halves 214 and 216, and the mold halves clamped together, a good gripping action is provided to hold the sample tube assembly 200 in proper relationship to mold assembly 202.

Many different type of assemblies could be used for releasably holding the mold halves together. In the subject embodiment however, the handle assembly 204 comprises a generally tubular end portion 230 having an internal recess 232. The exterior of the mold halves 214 and 216 are slightly tapered in the manner shown. Thus, merely inserting the assembled mold halves and sample tube assembly into the opening 232 produces a clamping action sufficient to hold the components assembled for sample taking operations. After completion of a sample taking operation merely tapping the mold halves against the pouring floor will release them from the handle assembly 204. After the sample has solidified the mold halves can be separated and the sample tube 200 smashed to release the solidified sample. By providing a new sample tube 200, the original mold halves 214 and 216 can be reused for another sampling operation.

The invention has been described in great detail sufficient to enable one of ordinary skill to make and use the same. Obviously, modifications and alterations in the preferred embodiments will occur to others upon a reading and understanding of the specification. All such alterations are to be considered as part of the invention insofar as they come within the scope of the claims.

What is claimed is:

1. In an apparatus for taking a sample from a flowing stream of molten metal and including a plurality of separable mold forming elements which cooperate to form a mold chamber, and a first temperature and thermal shock resistant tube extending outwardly from said chamber to direct a molten metal from the stream into the mold chamber, the improvement comprising:

a sample tagging member positioned between said mold forming elements and including a first end portion extending into said chamber and a second end portion extending out of said chamber.

2. The improvement as defined in claim 6 wherein said tagging member comprises a generally U-shaped wire loop with the legs of the loop extending into the chamber.

3. In an apparatus for taking a sample from a flowing stream of molten metal and including a plurality of separable mold forming elements which cooperate to form a mold chamber, and a first temperature and thermal shock resistant tube extending outwardly from said chamber to direct a molten metal from the stream into the mold chamber, the improvement comprising:

a second tube formed of temperature and thermal shock resistant material extending from said chamber, said second tube being hollow and having first and second ends with said first end opening into said chamber to permit molten metal to flow from said chamber into said second tube and said second end including means to prevent molten metal from passing therethrough while allowing air to escape from within said second tube during a sample taking operation; and, wherein said second tube is closely adjacent said first tube and positioned so as to be protected by said first tube during a sample taking operation.

4. In an apparatus for taking a sample from a flowing stream of molten metal and including a plurality of separable mold forming elements which cooperate to form a mold chamber, and a first temperature and thermal shock resistant tube extending outwardly from said chamber to direct a molten metal from the stream into the mold chamber, the improvement comprising:

a second tube formed of temperature and thermal shock resistant material extending from said chamber, said second tube being hollow and having first and second ends with said first end opening into said chamber to permit molten metal to flow from said chamber into said second tube and said second end including means to prevent molten metal from passing therethrough while allowing air to escape from within said second tube during a sample taking operation; and, wherein said first and second tubes are bonded in side-by-side relationship.

* * * * *